H. R. & G. W. Hubbard,
Truss.

Nº 6,353.   Patented Apr. 17, 1849.

UNITED STATES PATENT OFFICE.

H. R. HUBBARD AND G. W. HUBBARD, OF MIDDLETOWN, CONNECTICUT.

ABDOMINAL SUPPORTER.

Specification of Letters Patent No. 6,353, dated April 17, 1849.

*To all whom it may concern:*

Be it known that we, HERBERT R. HUBBARD and GEORGE W. HUBBARD, both of the city of Middletown, in the county of Middlesex and State of Connecticut, have invented a new and useful Improvement in Abdominal Supporters; and we do hereby declare that the following is a full, clear, and exact description of the construction and operation of the same, reference being had to the accompanying drawings, which make a part of this specification, in which—

Figure 1:
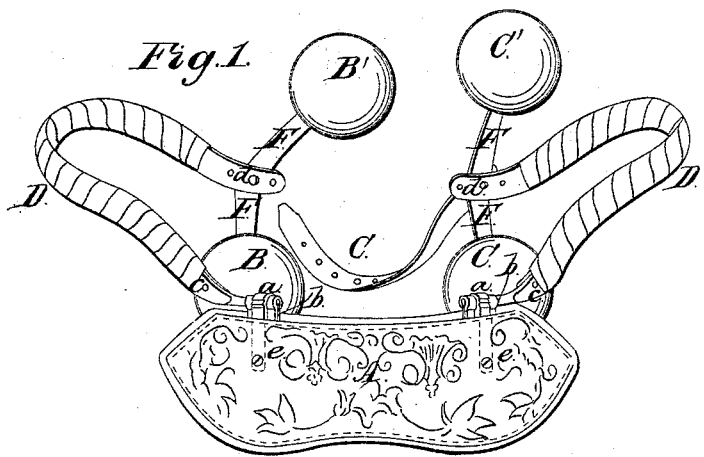
Figure 2:
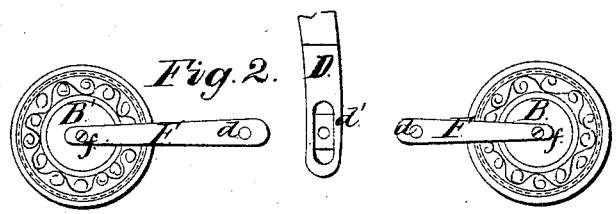
Figure 3:
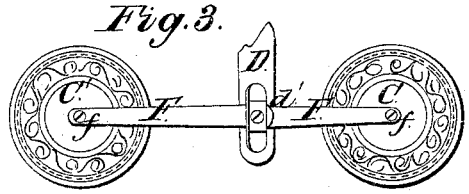
Figure 4:
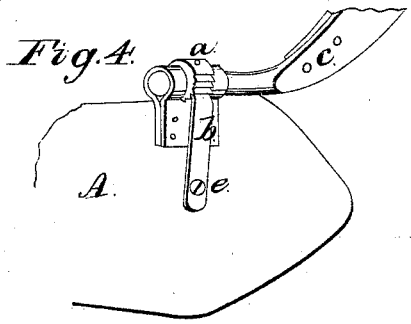

Figure 1, is a perspective view of the whole apparatus. Fig. 2 is a direct view, or plan of two of the back pads, attached to the ends of their appropriate springs, which springs are detached from the end of the main spring which passes around, over the hips to the back, and shows the clasp, or strap, under which the short springs are fastened. Fig. 3 is a direct view, or plan, of the other two back pads, attached to the ends of their appropriate springs, and shows the manner of attaching these short springs to the end of the main spring which passes around over the hips to the back. Fig. 4 is a perspective view of a section, showing the cylindrical ratch, and the spring click, or dog.

Our improvement consists in attaching one end of each of the main springs, which pass over the hips around to the back, to the upper corner of the front pad, or supporter, by means of a cylindrical ratch and spring click, or dog, in such a manner that the pad may, at any time, be caused to press as much as is desired, and most where it is most needed, at the pleasure of the wearer.

We make the front, or main, pad A, Fig. 1, with a plate of tinned iron, or any other suitable substance, and cover it with soft leather, or cloth, stuffed, or padded in the ordinary way. We make the main spring D and D, Fig. 1, of steel, of the flat form, and of a suitable shape to pass over the hips and around to the back, and attach them, with rivets, or screws, to the shank pieces, as seen at $c$, Figs. 1, and 4. We make the shank pieces also of steel, and attach them to the upper corners of the front pad, A, Figs. 1, and 4, by passing the round ends through double cylindrical sockets riveted to the pad, A, as seen in Figs. 1, and 4. On the round part of each of the shank pieces, and between the two parts of the double cylindrical sockets, we place a cylindrical ratch, $a$, Figs. 1, and 4, secured from turning on the shank piece by a pin passing through it, or by any other convenient means. This ratch secures the pad, A, in the desired position by means of the spring click, or dog, $b$, Figs. 1, and 4, which is also secured to the pad, A, by means of a screw, or rivet, $e$, as seen in Figs. 1, and 4. We make the four back pads B, B', and C, C', in the common, or any other convenient way, and attach them to the ends of four flat steel springs, F, Figs. 1, 2, and 3, by means of screws, $f, f, f, f$, as seen in Figs. 2, and 3. Two of these four flat steel springs F, are attached to the end of each of the main springs, D, and D, Fig. 1, by passing the ends, $d$, and $d$, Fig. 2, under the clasp, or strap, $d'$, Fig. 2, and by inserting a screw, or rivet, through the hole in the clasp, or strap, at $d'$, through the two holes, $d$, and $d$, in the springs, and thence into the main spring, D, Fig. 2, when they will all be as seen in Fig. 3. This clasp, or strap, $d'$, Figs. 2, and 3, we make so long as to allow the springs, F, to move on the screw, or rivet, as a joint pin, so that either of the back pads, B, B', and C, C', may be moved either way, as seen in Fig. 1, without altering the position of either of the other three pads.

When worn, the back ends, $d, d$, Fig. 1, of the two main springs, D, D, Fig. 1, are to be connected by a leather, or other suitable strap, or fastening, as seen at E, Fig. 1, hitched onto knobs on the head of the screws, which operate as joint pins for the springs F, F, F, F, Fig. 1, or by any other convenient method, so as not to interfere with the free motion of the back pads.

The advantages of our improvement, over all others heretofore used or known, consist in the use of two cylindrical ratches, and spring clicks, or dogs, attached to the upper edge of the front pad, or supporter, near the ends, in such a manner that the wearer can vary the degree of pressure, at pleasure, not only of the whole of the front pad, but also to cause one end of the pad to press with greater force than the other, when deemed necessary; and thus make it answer, well, the purpose of a truss in cases of hernia inguinalis; and in such cases, if found necessary, a small pad, of the proper construction may be readily attached to the inner surface of the front pad, by a screw, or otherwise, and removed at pleasure.

We are aware that a ratch and click, or dog, has long been used for trusses; and that four back pads attached to springs, have long been used for abdominal supporters, we therefore claim none of these, as such, but

We claim the combination of the two ratches, and spring clicks, or dogs, with the main springs and front pad, so arranged as to enable the wearer to regulate the pressure of the whole pad, or either end of it, at pleasure, the whole constructed, arranged, combined, and operating, and for the purposes, substantially as herein described.

HERBERT R. HUBBARD.
GEORGE W. HUBBARD.

Witnesses:
JENE BUEVAL,
R. FITZGERALD.